(12) United States Patent
Rudolph

(10) Patent No.: US 9,682,825 B2
(45) Date of Patent: Jun. 20, 2017

(54) SEGMENTED IDLER FOR USE IN A CONVEYOR BELT INSTALLATION

(71) Applicant: Morné Rudolph, Alberton (ZA)

(72) Inventor: Morné Rudolph, Alberton (ZA)

( * ) Notice: Subject to any disclaimer, the term of this patent is extended or adjusted under 35 U.S.C. 154(b) by 0 days.

(21) Appl. No.: 14/894,713

(22) PCT Filed: May 29, 2014

(86) PCT No.: PCT/IB2014/061811
§ 371 (c)(1),
(2) Date: Nov. 30, 2015

(87) PCT Pub. No.: WO2014/191951
PCT Pub. Date: Dec. 4, 2014

(65) Prior Publication Data
US 2016/0130092 A1   May 12, 2016

(30) Foreign Application Priority Data

May 31, 2013   (ZA) .................................. 2013/03976

(51) Int. Cl.
*B65G 39/04*   (2006.01)
*B65G 23/04*   (2006.01)
*B65G 39/07*   (2006.01)

(52) U.S. Cl.
CPC ............ *B65G 23/04* (2013.01); *B65G 39/04* (2013.01); *B65G 39/07* (2013.01)

(58) Field of Classification Search
CPC ....................................................... B65G 39/04
USPC .................. 193/37; 198/779; 492/38, 39, 40
See application file for complete search history.

(56) References Cited

U.S. PATENT DOCUMENTS 3,929,391 A * 12/1975 Pico ...................... B65G 39/09
                                                        384/546
5,848,958 A * 12/1998 Damkjær ............... B65G 39/04
                                                         492/15
5,967,450 A * 10/1999 May ....................... B65H 18/26
                                                         242/547

(Continued)

FOREIGN PATENT DOCUMENTS

CN        2425899 Y    4/2011
DE        8524053 U1  10/1985
EP        0679596 A1  11/1995

OTHER PUBLICATIONS

International Patent Application No. PCT/IB2014/061811, Search Report and Written dated Aug. 11, 2014.

*Primary Examiner* — Douglas Hess
(74) *Attorney, Agent, or Firm* — Kilpatrick Townsend & Stockton LLP; Dean W. Russell

(57) ABSTRACT

An idler 100 (e.g. for a conveyor belt installation) includes plural sleeve segments 102.1-102.5 which constitute an outer sleeve 102. More specifically, the idler 100 has a central axle 104 and a bearing surface provided concentrically with and radially outwardly from the axle 104. The idler 100 is characterized in that it has a plurality of sleeve segments 102.1-102.5 which fit together end-to-end thereby to define a cylindrical segmented sleeve 102 which presents the bearing surface, at least some of the sleeve segments 102.1-102.5 having an inner radially extending support 204 wall thereby to support the segmented sleeve 102 intermediate its ends.

16 Claims, 7 Drawing Sheets

(56) References Cited

U.S. PATENT DOCUMENTS

| | | | | |
|---|---|---|---|---|
| 6,280,371 | B1* | 8/2001 | Krippelz | B23P 15/00 |
| | | | | 29/895.213 |
| 6,730,008 | B1* | 5/2004 | Liang | F16C 13/00 |
| | | | | 492/40 |
| 7,010,952 | B2* | 3/2006 | Hofmann | B21B 31/08 |
| | | | | 492/1 |
| 7,131,295 | B2* | 11/2006 | Andou | C03B 23/0254 |
| | | | | 492/16 |
| 7,464,923 | B2* | 12/2008 | Faguy | B65H 3/5261 |
| | | | | 271/109 |
| 7,798,949 | B2* | 9/2010 | Vaaraniemi | F16C 13/028 |
| | | | | 492/39 |
| 7,887,041 | B2* | 2/2011 | Takiguchi | B65H 5/06 |
| | | | | 271/109 |
| 8,042,807 | B2* | 10/2011 | Biegelsen | B41J 3/60 |
| | | | | 271/272 |
| 8,684,058 | B2* | 4/2014 | Byerley | B29D 30/28 |
| | | | | 156/130.3 |

* cited by examiner

SEGMENTED IDLER FOR USE IN A CONVEYOR BELT INSTALLATION

CROSS REFERENCE TO RELATED APPLICATIONS

This application is the U.S. national phase entry of International Patent Application No. PCT/IB2014/061811, filed on May 29, 2014, which application is related to and claims priority benefits from South Africa Patent Application No. 2013/03976, filed on May 31, 2013, the entireties of each of which are incorporated herein by reference.

FIELD OF INVENTION

This invention relates generally to conveyor belt installations and idlers (or rollers) for such installations, and specifically to a segmented idler for use in a conveyor belt installation (and to a conveyor belt installation including such a segmented idler).

BACKGROUND OF INVENTION

In conventional conveyor belt installations of which the Applicant is aware, a continuous conveyor belt is mounted to be supported and guided by a plurality of cylindrical idler (which may be either freely rotatable or driven by a drive mechanism). Such idlers typically comprise a central metal axle and a hollow cylindrical polymeric sleeve mounted by means of bearings to rotate about the axle. An exterior surface of the sleeve provides a bearing surface to bear against (and usually to support) a conveyor belt thereon. The axle projects axially outwardly past either end of the sleeve to provide mounting lugs at ends thereof.

A drawback that the Applicant has noted is that the sleeve tends to deform over time. This deformation is more pronounced under heavier loads or harsher operating conditions. In addition, if the conveyor belt is stopped and the idler is required to support a stationary load, this also causes deformation of the polymeric sleeve. More specifically, under moving (rolling) conditions, the sleeve tends to develop a concavity (usually symmetrically) which is most pronounced around its mid-portion. This is due to the constant inward force exerted by the conveyor belt. When the belt is stationary, the weight of the belt will be in a fixed direction, causing the idler to deform (usually asymmetrically) away from the belt.

This deformation is caused, in part, because the idler (specifically the sleeve) is hollow. However, it is hollow of necessity—having a solid sleeve would render the idler impractically heavy and prohibitively expensive. Accordingly, the Applicant desires an idler which at least partially overcomes these drawbacks and advantageously is more resistant to deformation and may optionally provide additional benefits.

SUMMARY OF INVENTION

Accordingly, the invention provides an idler having a central axle and a bearing surface provided concentrically with, and radially outwardly from, the axle, characterised in that the idler includes:

a plurality of sleeve segments which fit together end-to-end thereby to define a cylindrical segmented sleeve which presents the bearing surface, at least some of the sleeve segments having an inner radially extending support wall thereby to support the segmented sleeve intermediate its ends.

The idler is accordingly referred to as a segmented idler.

The idler may include bearings. The idler may include a pair of bearings at or near each end thereof. The bearing may be annular ring bearings fixed on their inner surface to the axle and permitting rotation of the segmented sleeve relative to the axle.

The idler may include an intermediate support member. The support member may be hollow and cylindrical. The support member may be arranged between the axle and the segmented sleeve (i.e. around the axle and radially inwardly of the segmented sleeve). The support member may be mounted concentrically with, and to rotate about, the axle (thus also having an axis of rotation coaxially with the axle). There may be a clearance space between the support member and the axle. The support member may have a radially outwardly projecting lip at each end thereof, to prevent any sleeve segments from sliding axially off the end of the support member.

The support member may be mounted to the axle by means of the bearings. The idler may include a seal member adjacent each bearing. The seal element may be arranged axially outwardly of each bearing. The seal element may be annular, having a similar overall shape to that of the bearing. The seal element may provide a labyrinth seal.

The support member may include a circumferentially extending ridge on an inner side thereof inward of each end. The ridge may be arranged axially inwardly of the bearing and may be operable to seat the bearing relative to the support member.

The support member may be of metal, e.g., mild steel.

Each sleeve segment may include two walls: a cylindrical outer wall which presents a portion of the bearing surface and the radially inwardly projecting support wall. Each sleeve segment may in axial-sectional view thus be generally T-shaped (when the support wall projects inwardly from roughly a centre of the outer wall) or more L-shaped (when the support wall is offset and projects inwardly from one side of the outer wall, or somewhere in between.

The support wall of each sleeve segment may extend between the outer wall and the support member. Thus, plural support walls (from plural sleeve segments) may serve to support the outer wall—and the bearing surface defined by the other wall—at a plurality of axially spaced positions along the length of the idler. Thus, the provision of the supporting walls may inhibit inward deformation of the bearing surface.

Each sleeve segment may include an abutting formation at each axial end thereof, for abutting against an adjacent sleeve segment. Adjacent abutting formations may permit adjacent sleeve segments to be joined together, even locked together, so that their respective portions of the bearing surface are aligned and seemingly continuous. The abutting formations may provide a fictional fit between two adjacent sleeve portions. The abutting formations may be selected from a number of conventional interlocking configurations, e.g., tongue and groove, spigot and socket, or merely complemental step/seat formations.

There may be plural variants of sleeve segments. One difference between the different sleeve segment variants may be the abutting formations.

There may be a centre sleeve segment. The centre sleeve segment may be symmetrical in that it has the same abutting formation at each axial end (e.g. male-male or female-female).

There may be an intermediate sleeve segment. The intermediate sleeve segment may have opposite but complemental abutting formations at each axial end (e.g. male-female or female-male). Adjacent intermediate sleeve segments may therefore be arranged in the same orientation.

Where there is a centre sleeve segment and intermediate sleeve segments, the intermediate sleeve segments on one side may all be arranged in one orientation, while the intermediate sleeve segments on the other side may all be arranged in an opposite orientation. Thus, the centre sleeve portion may serve to reverse the orientation of the intermediate sleeve portions. (The centre sleeve segment need not necessarily be arranged in a centre of the idler, but it may be between intermediate sleeve segments.)

There may be an end sleeve segment. The end sleeve segment may have an end abutment configured for accommodating an end piece, e.g., an end cap or sidewall.

An example arrangement of the varieties of sleeve segments may be: end segment (orientated in a first direction)—plural intermediate segments (orientated in the first direction)—centre segment—plural intermediate segments (orientated in a second direction which is opposite to the first direction)—end segment (orientated in the second direction).

The sleeve segments may be of a polymer, e.g., HDPE, nylon, or other blow mouldable polymer.

The idler may include end caps, one at each axial end. The end caps may include concentric ridges to cooperate with complemental grooves in the end segment thereby to provide a labyrinth seal. The ridges and grooves may be V-shaped so as to provide outwardly inclined surface to assist in expelling or inhibiting ingress of water, dust, or other contaminants. There may be two ridges and corresponding grooves. The end caps may be of a polymer, e.g., HDPE, nylon, or other blow mouldable polymer.

The axle may be of metal, e.g., bright steel.

The invention extends to a method of assembling a segmented idler as defined above, including providing at least two idler segments to rotate about an axle, the idler segments together providing a bearing surface.

The invention extends to a conveyor belt installation including a supporting framework, at least one segmented idler as defined above mounted to the framework, and a conveyor belt bearing, at least partially, on the segmented idler.

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
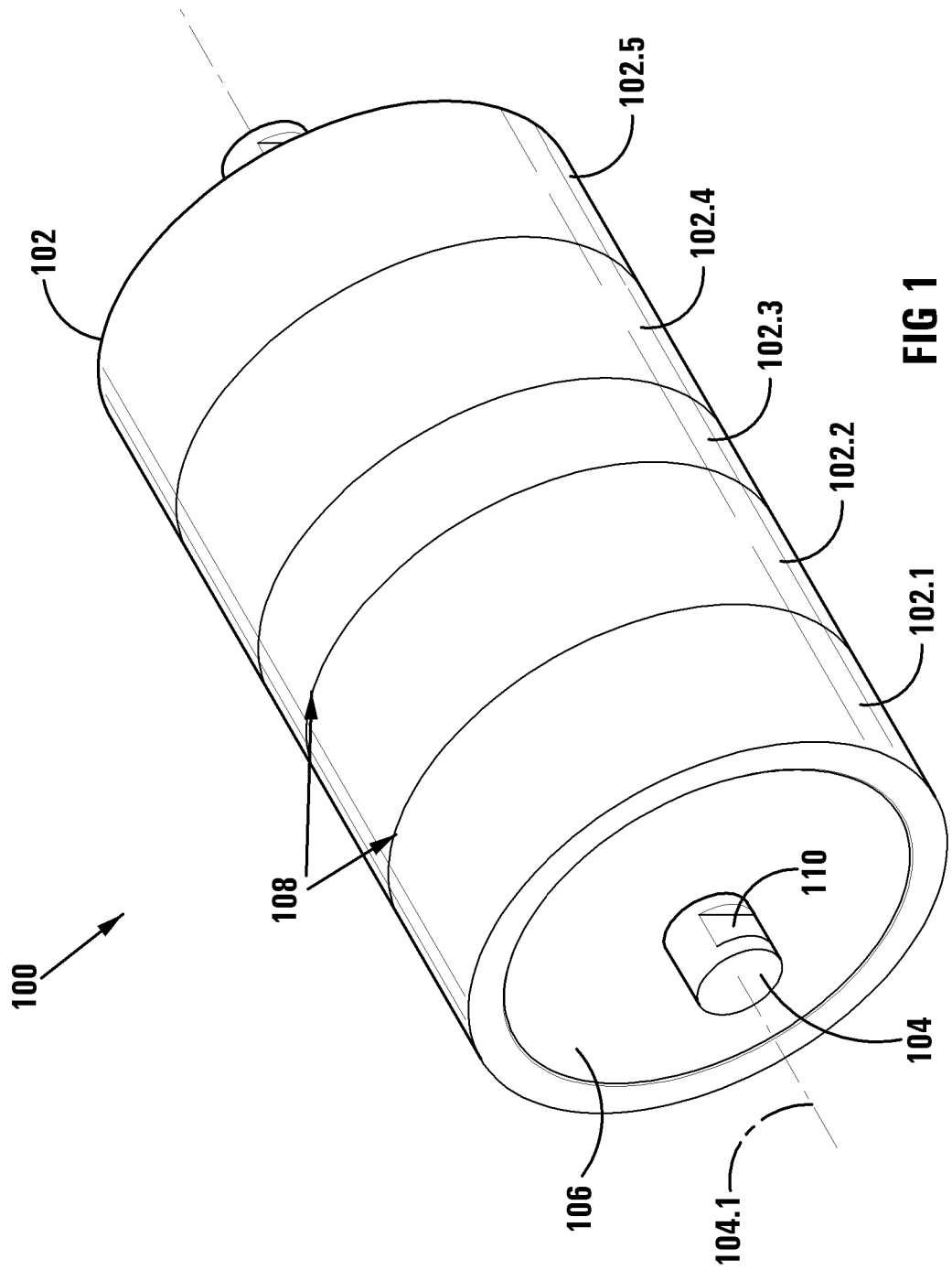
FIG. 1 shows a three-dimensional view of a segmented idler, in accordance with the invention.

FIG. 1 illustrates a segmented idler 100 in accordance with the invention. The idler 100 has a central axle 104 and a cylindrical segmented sleeve 102 which presents an outer bearing surface. The sleeve 102 is operable to rotate about an axis of rotation 104.1 provided by the axle 104, thus being coaxial with the axle 104. The sleeve 102 looks almost continuous even though it comprises a plurality of sleeve segments 102.1-102.5. The only clue from the exterior that the sleeve 102 is composed of the sleeve segments 102.1-102.5 is a seam or joint 108 between each pair of adjacent sleeve segments 102.1-102.5. The idler 100 has end caps 106, one at each axial end thereof.

The idler 100 can thus function the same way as a conventional idler. Ends of the axle 104 have grooves 110 keyed in for mounting the idler 100 to a support framework (not illustrated). The sleeve 102 presents a generally uniform bearing surface which can accommodate a conveyor belt and more particularly a loaded conveyor belt.

Figure 2:
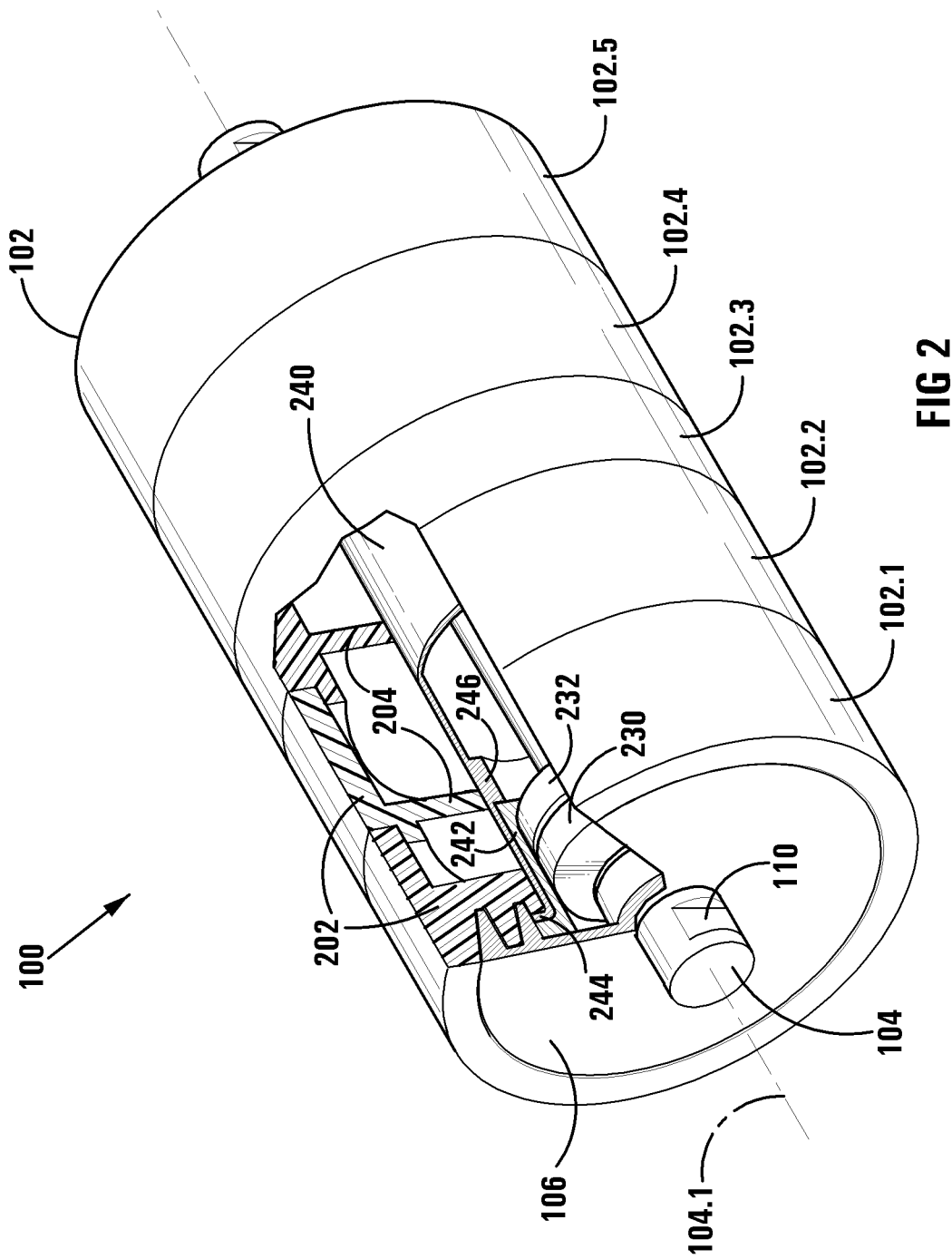
FIG. 2 shows a three-dimensional cut away view of the segmented idler of FIG. 1.
Figure 3:
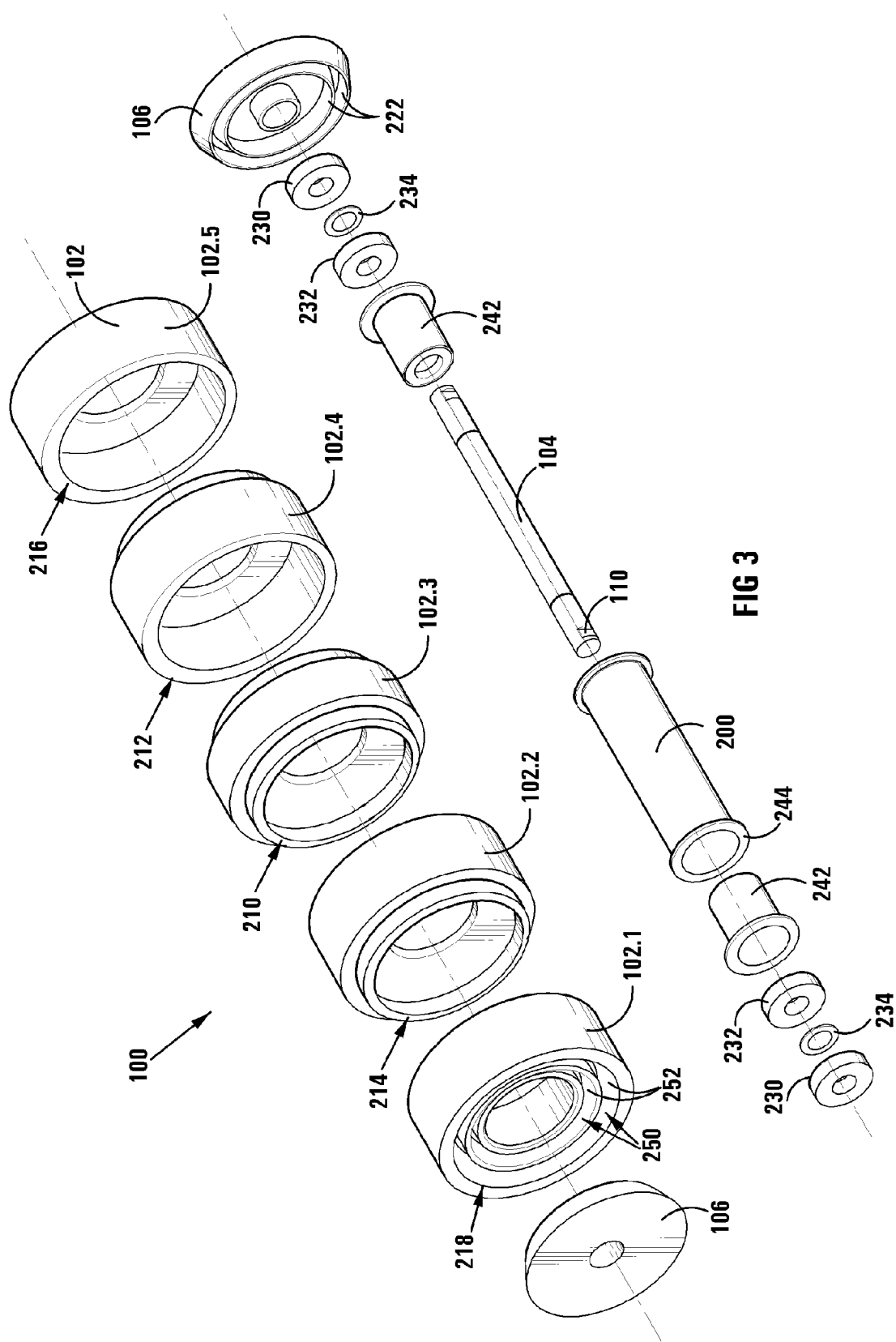
FIG. 3 shows a three-dimensional exploded view of the segmented idler of FIG. 1.
Figure 4:
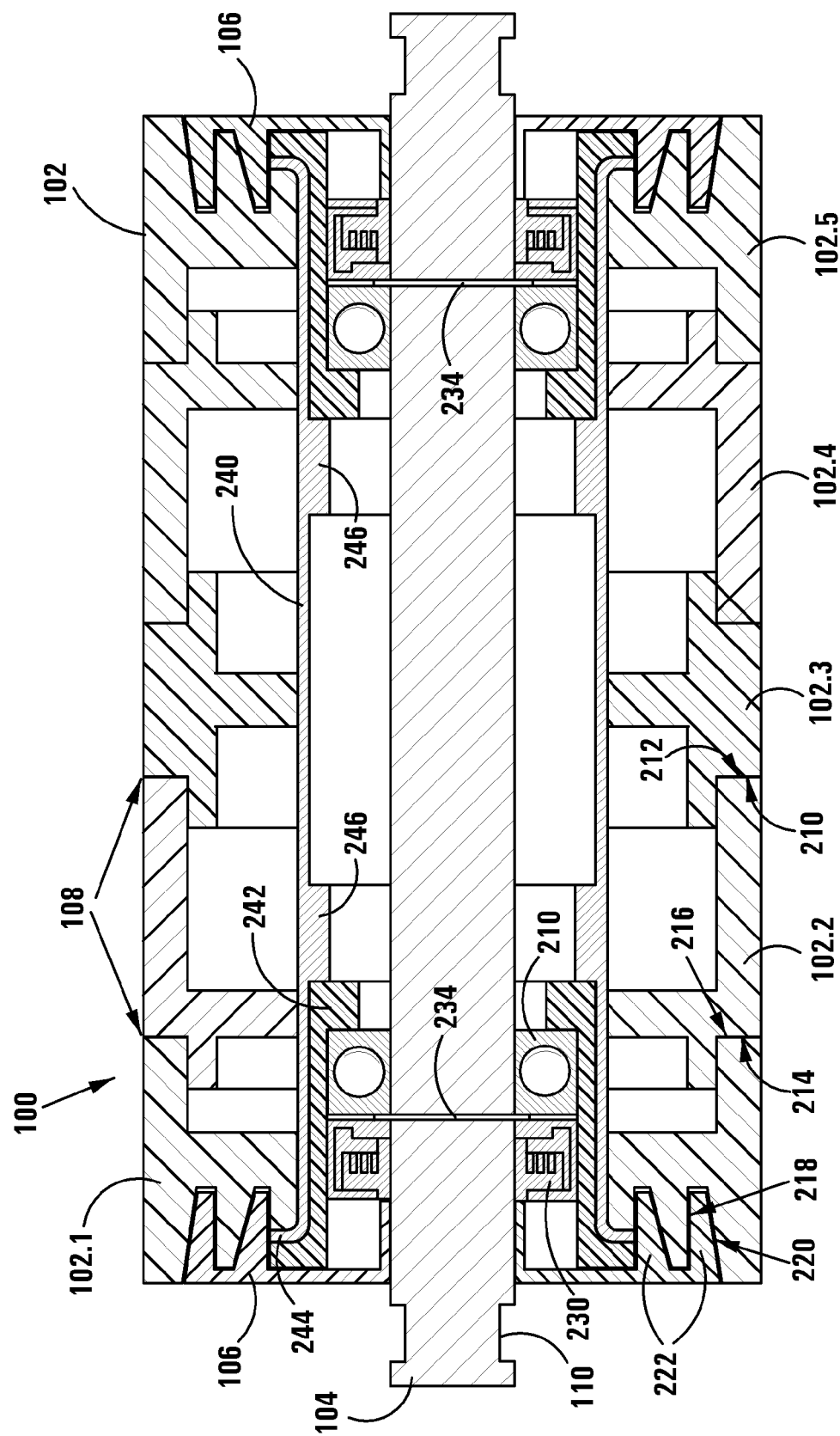
FIG. 4 shows an axial sectional view of the segmented idler of FIG. 1.

FIGS. 2-4 illustrate the internal composition of the segmented idler in more detail and specifically show the individual sleeve segments 102.1-102.5 in more detail. Turning first to the sleeve segments 102.1-102.5: in this example, there are three varieties of sleeve segments 102.1-102.5, namely, two end sleeve segments 102.1, 102.5, two intermediate sleeve segments 102.2, 102.4, and one centre sleeve segment 102.3.

Although only two intermediate sleeve segments 102.2, 102.4 (one on each side of the centre segment 102.3) are illustrated, there may be more than two, depending on the required length of the idler 100 and thickness of the sleeve segments 102.1-102.5. It is accordingly an advantage of the invention that the idler 100 is modular and the sleeve segments 102.1-102.5 can be configured as desired, to suit different operating criteria. Also, there could be more or fewer varieties of sleeve segments 102.1-102.5. For example, in an alternative embodiment, there might be no intermediate sleeve segments 102.2, 102.4 and the end sleeve segments 102.1, 102.5 may connect directly to the centre sleeve segment 102.3.

Each sleeve segment 102.1-102.5 comprises two walls: a cylindrical outer wall 202 which presents a portion of the bearing surface and a radially inwardly projecting support wall 204. While each sleeve segment 102.1-102.5 has the outer wall 202 and support wall 204, the configuration of these walls 202, 204 differs from one variety of sleeve segment 102.1-102.5 to another, each of which is described in turn below.

Figure 5:
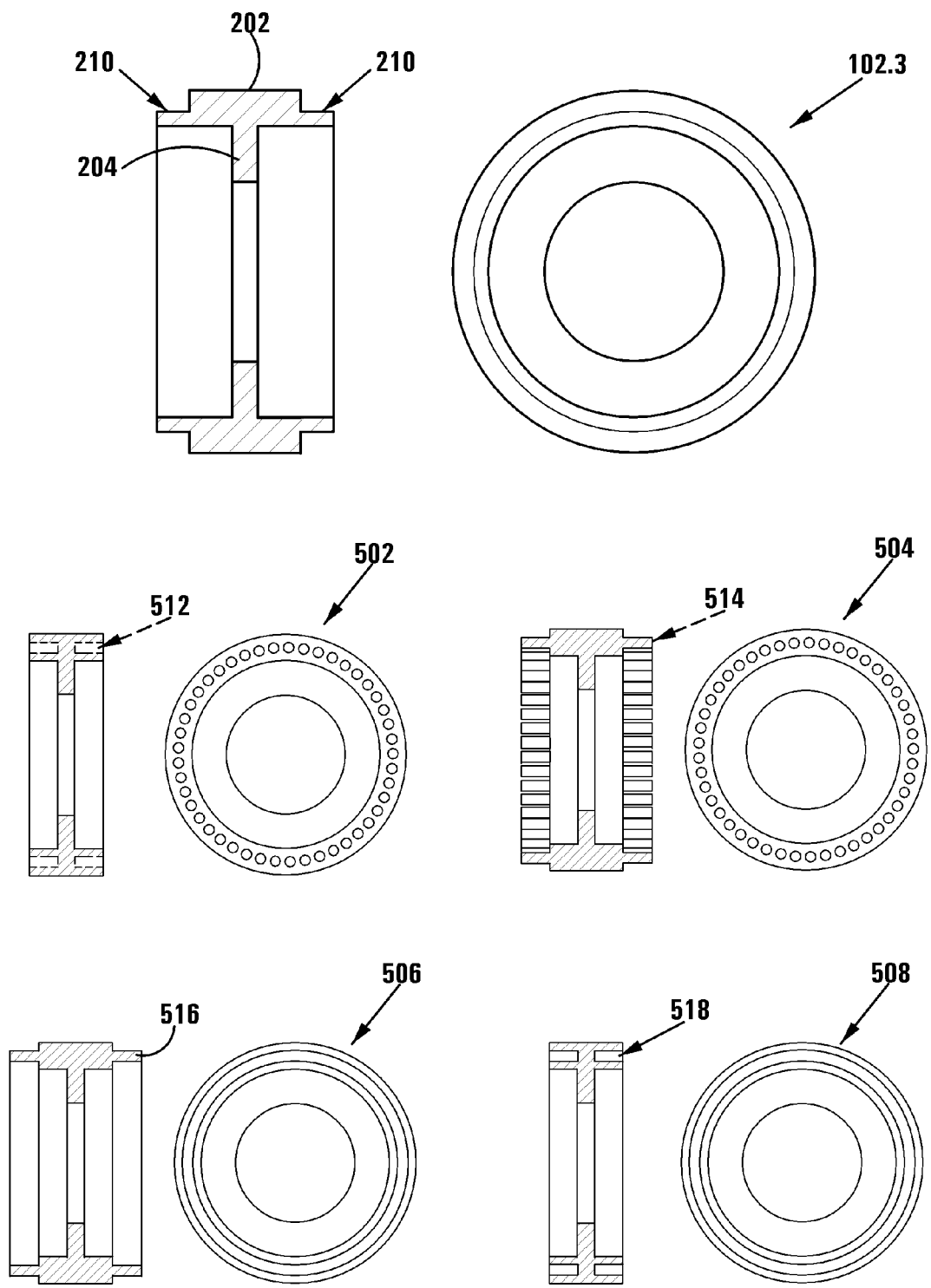
FIG. 5 shows various views of different embodiments of centre sleeve segments of the segmented idler of FIG. 1.

FIG. 5 illustrates the centre sleeve segment 102.3 (as well as alternative embodiments 502-508) thereof. The centre sleeve segment 102.3 is symmetrical and the support wall 204 projects radially inwardly from an axial centre of the outer wall 202, the centre sleeve segment 102.3 thus having a T-shaped profile. The outer wall 202 defines matched abutting surfaces 210 which are in the form of a simple step.

An abutting surface 210 can cooperate frictionally with a complemental surface (see below). In alternative embodiments 502-508, the abutting surfaces may be in the form of sockets 512, spigots 514, a tongue 516, or a groove 518. The abutting surfaces 210 thus serve not only to abut but also to interlock adjacent sleeve segments 102.1-102.5.

The centre sleeve segment 102.3 is made of HDPE and complies with SANS (South African National Standard) 4427-1.

Figure 6:
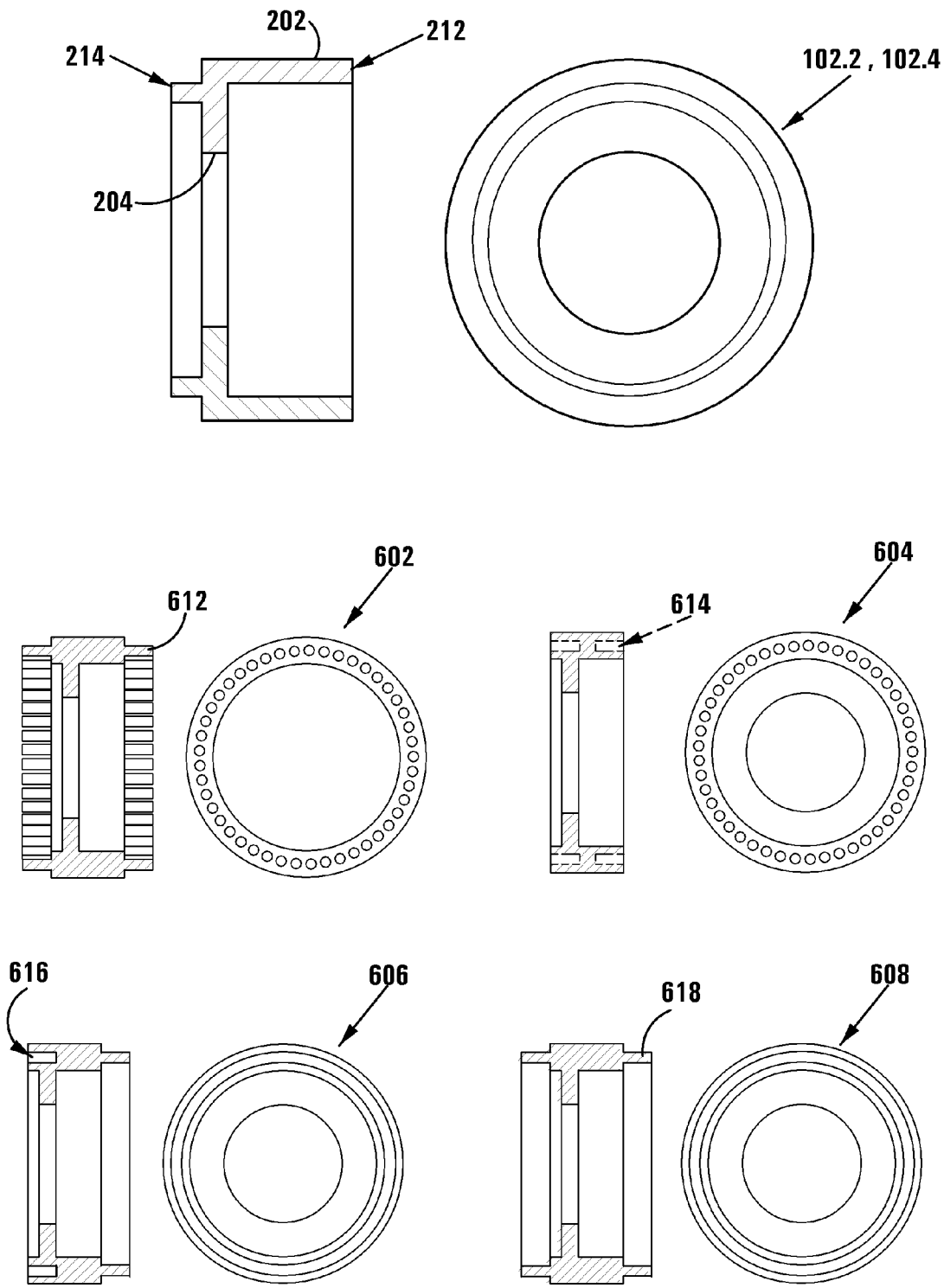
FIG. 6 shows various views of different embodiments of intermediate sleeve segments of the segmented idler of FIG. 1.

FIG. 6 illustrates the intermediate sleeve segment 102.2, 102.4 (as well as alternative embodiments 602-608). The intermediate sleeve segment 102.2, 102.4 is asymmetrical and the support wall 204 is axially offset relative to the outer wall 202, thus having a more L-shaped profile. Abutting surfaces 212, 214 on the intermediate sleeve segment 102.2, 102.4 can cooperate with that of the centre sleeve segment 102.3 and also with other intermediate sleeve segments 102.2, 102.4, arranged end-to-end in the same orientation. The abutting surface 212 on one axial side is in the form of a cylindrical wall while the opposite abutting surface 214 is a simple step (like those of the centre sleeve segment 102.3). In alternative embodiments, 602-608, the abutting surfaces include spigots 612, sockets 614, a groove 616, or a tongue 618.

The intermediate sleeve segment 102.2, 102.4 is made of HDPE and complies with SANS 4427-1.

Figure 7:
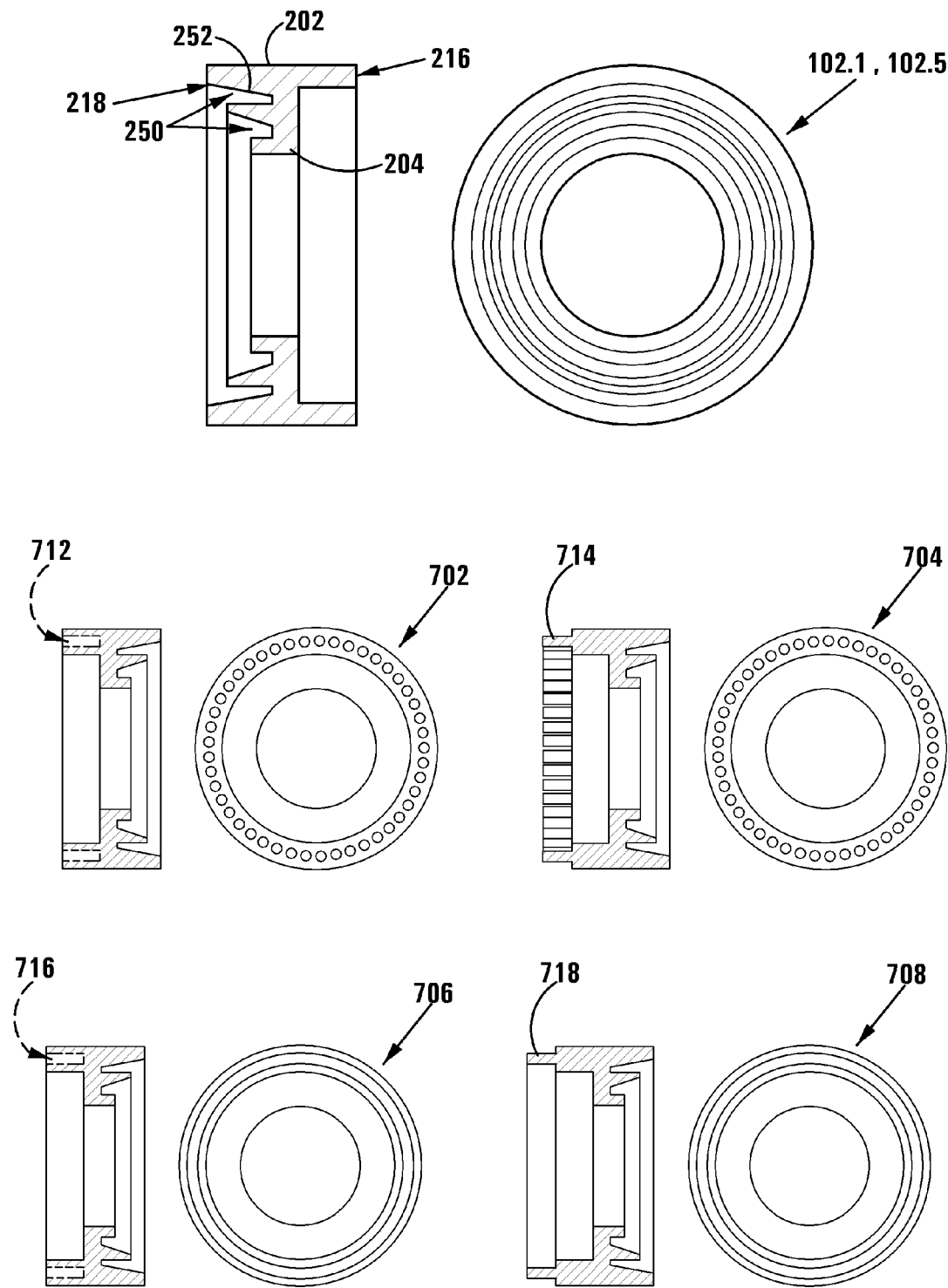
FIG. 7 shows various views of different embodiments of end sleeve segments of the segmented idler of FIG. 1.

FIG. 7 illustrates the end sleeve segment 102.1, 102.5 (as well as alternative embodiments 702-708). The end sleeve segment 102.1, 102.5 also has a support wall 204 projecting transversely from the outer wall 202. The end sleeve segment 102.1, 102.5 is also asymmetrical, having an abutting surface 216 on one side, and a cap-engaging surface 218 on the other side. The cap-engaging surface 218 defines a pair of concentric V-shaped grooves 250 with outer walls 252 angled obliquely outwardly. The abutting surface 216 is merely a cylindrical wall. Again, in alternative embodiments, 702-708, the abutting surfaces include sockets 712, spigots 714, a groove 716, or a tongue 718.

The end sleeve segment 102.1, 102.5 is made of HDPE and complies with SANS 4427-1.

The end cap 106 has a flat disc-shaped outer surface and a profile of an inner surface 220 complemental to the cap-engaging surface 218. More specifically, the inner surface 220 has two concentric sharp ridges 222, for cooperating with the grooves 250 thereby to define a labyrinth-type seal between the end cap 106 and the end sleeve segment 102.1, 102.5. The inclination of the ridges 222 and grooves 250 encourages dispersal of water, dust, and other contaminants. The end cap 106 fits snugly over the axle 104. The end cap 106 does not necessarily provide a fluid-tight seal, but is certainly a first line of defence.

The end cap 106 is made of HDPE and complies with SANS 4427-1.

Referring now to the internal configuration which is best illustrated in FIGS. 2 and 4, the central axle 104 is of bright steel, complying with BS 970 Part 1, grade 070 M20 (EN3B). The axle 104 has mounted at each end a seal member in the form of an annular labyrinth seal 230 and an annular bearing 232 axially inwardly of the seal 230. The seal 230 is a three-part seal made of polypropylene and serves to shield the bearing 232 from any contaminants which may slip past the end cap 106. The bearing 232 is a 6205 2RS bearing with a C3 clearance. An annular steel circlip 234 fast with the axle 104 locates the seal 230 and bearing 232 in place.

Importantly, the idler 100 has an intermediate support member in the form of an inner tube 240 arranged concentrically between the axle 104 and the segmented sleeve 102. The tube 240 is made of mild steel, complying with SANS 657-3. A seat ring 242 seats and locates the tube 240 firmly around the bearings 232 to ensure that the tube 240 is coaxial with the axle 104. The seat ring 242 is of HDPE and complies with SANS 4427-1.

The tube 240 serves to bear against and support the support walls 204 of each of the sleeve segments 102.1-102.5. When assembled, the support walls 204 act like supporting ribs serving to distribute a load transmitted from the bearing surface of the sleeve 102 evenly along the length of the tube 240. Thus, even the centre sleeve segment 102.3, spaced away from the bearings 232, is supported. It will thus be noted that the sleeve 102 is still predominantly hollow, with the support walls 204 not contributing significantly to the weight or to the cost of materials.

Ends of the tube 240 have a circumferentially extending flange 244 to prevent the end sleeve segments 102.1, 102.5 from sliding axially of the tube 240. Also, an internal ridge 246 provided at each end of the tube 240 serves to locate and sandwich the seat ring 242 firmly in place.

In use, the idler 100 is installed just as a conventional idler would be. The grooves 110 in the axle 104 allow the idler 100 to be installed in a conventional support framework and for the sleeve 102 to rotate about the axis of rotation 104.1. A conveyor belt installation will have a series of idlers 100 spaced along a path of the conveyor belt (not illustrated). The conveyor belt is provided to rest on the bearing surface of the sleeve 102 and the idler 100 will then carry the weight of the conveyor belt with any material on top thereof. The load from the conveyor belt will be evenly axially distributed by each of the support walls 204 to the tube 240. The tube 240 is of steel and is therefore rigid and will not deform under tolerated operating conditions. The load will be transmitted from the tube 240 via the bearings 232 to the axle 104 and finally to the external support framework.

The advantages of the invention as exemplified are numerous. The idler 100 is modular because the sleeve segments 102.1-102.5 are removable and interchangeable. Thus, the idler 100 may be assembled to have a sleeve segment 102.1-102.5 sequence to meet a desired application or intended usage. Specifically, the length of the idler 100 can be varied by adding or removing sleeve segments 102.1-102.5, particularly intermediate sleeve segments 102.2, 102.4.

The idler 100 is a free-spinning idler which makes it belt-friendly. The bearing 232 will ensure that the idler 100 offers negligible rotational resistance, even under load. This also saves on start-up cost of the conveyor belt installation.

The interlocking of the sleeve segments 102.1-102.5 by means of the abutment surface 210-216 actually strengthens and reinforces each sleeve segment 102.1-102.5 and increases the load-carrying capacity of the sleeve 102 as a whole. The support walls 204 act as distributed support ribs, strengthening the sleeve 102 and enhancing the structural integrity thereof.

Also, the sealing mechanisms, provided by both the end caps 106 cooperating with the end sleeve segments 102.1, 102.5 and by the labyrinth seal 230 together with the seat ring 242, prevent or at least significantly inhibit water, dust, and other contaminants from reaching the bearing 232 and an interior of the tube 240, reducing corrosion and prolonging operating life.

The bearings 232 are completely aligned and coaxial with the tube 240 and the axle 104 which permits smooth rotation and prolonged bearing life. Even if the sleeve 102 temporarily shifts slightly under an uneven load, the tube 240 and axle 104 will remain coaxial.

Even with these advantages, the idler 100 is still relatively light because the sleeve segments 102.1-102.5 are predominantly hollow and the tube 240 is thin and generally hollow. This means that the idler 100 in accordance with the invention can be handled as easily as a conventional idler, with no modification to the support framework required. It is therefore retrofittable with no modification required to any other part of the conveyor belt installation.

The invention claimed is:

1. An idler having a central axle and a bearing surface provided concentrically with and radially outwardly from the axle, wherein the idler includes:
   a plurality of sleeve segments which fit together end-to-end thereby to define a cylindrical segmented sleeve which presents the bearing surface, wherein each sleeve segment includes an abutting formation at each axial end thereof, configured to abut against an adjacent sleeve segment or other component, and wherein adjacent abutting formations permit adjacent sleeve segments to be joined together, so that their respective portions of the bearing surface are aligned and seemingly continuous;
   a pair of annular ring bearings fixed on their inner surface to the axle and permitting rotation of the segmented sleeve relative to the axle;
   an intermediate support member which is hollow and cylindrical and arranged between the axle and the segmented sleeve, the support member being mounted by means of the bearings concentrically with, and to rotate about, the axle, thus having an axis of rotation coaxial with the axle; and
   at least some of the sleeve segments having an inner radially extending support wall thereby to support the segmented sleeve intermediate its ends.

2. The idler as claimed in claim 1, which includes a seal member adjacent each bearing.

3. The idler as claimed in claim 2, in which the seal element is arranged axially outwardly of each bearing and is annular, having a similar overall shape to that of the bearing, and provides a labyrinth seal.

4. The idler as claimed in claim 1, in which each sleeve segment includes two walls: a cylindrical outer wall which presents a portion of the bearing surface and the radially inwardly projecting support wall.

5. The idler as claimed in claim 4, in which the support wall of each sleeve segment extends between the outer wall and the support member.

6. The idler as claimed in claim 5, in which plural support walls (from plural sleeve segments) serve to support the outer wall at a plurality of axially spaced positions along the length of the idler.

7. The idler as claimed in claim 1, in which the abutting formations provide a fictional fit between two adjacent sleeve portions.

8. The idler as claimed in claim 7, wherein the abutting formation includes an interlock configuration configured to provide the frictional fit and interlock adjacent sleeve segments.

9. The idler as claimed in claim 1, in which there are plural variants of sleeve segments.

10. The idler as claimed in claim 9, in which there is a centre sleeve segment which is symmetrical in that it has the same abutting formation at each axial end.

11. The idler as claimed in claim 9, in which there is an intermediate sleeve segment which has opposite but complemental abutting formations at each axial end.

12. The idler as claimed in claim 9, in which there is an end sleeve segment which has an end abutment configured for accommodating an end piece.

13. The idler as claimed in claim 1, which includes end caps, one at each axial end.

14. The idler as claimed in claim 13, in which the end caps include concentric ridges to provide a labyrinth seal.

15. A method of assembling a segmented idler as claimed in claim 1, the method including providing at least two idler segments to rotate about an axle, the idler segments together providing a bearing surface.

16. A conveyor belt installation including a supporting framework, at least one segmented idler as claimed in claim 1 mounted to the framework, and a conveyor belt bearing, at least partially, on the segmented idler.

* * * * *